(12) United States Patent
DeCataldo et al.

(10) Patent No.: US 10,646,096 B2
(45) Date of Patent: May 12, 2020

(54) FLOOD DETECTION SENSOR FOR A DISHWASHER APPLIANCE

(71) Applicant: Haier US Appliance Solutions, Inc., Wilmington, DE (US)

(72) Inventors: Charles Anthony DeCataldo, Boston, MA (US); Kyle Edward Durham, Louisville, KY (US); Craig Curtis, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 233 days.

(21) Appl. No.: 15/786,640

(22) Filed: Oct. 18, 2017

(65) Prior Publication Data

US 2019/0110658 A1    Apr. 18, 2019

(51) Int. Cl.
*A47L 15/42* (2006.01)
*A47L 15/00* (2006.01)
*G01F 23/00* (2006.01)
*G01F 23/24* (2006.01)

(52) U.S. Cl.
CPC ....... *A47L 15/4212* (2013.01); *A47L 15/0023* (2013.01); *G01F 23/0069* (2013.01); *G01F 23/241* (2013.01)

(58) Field of Classification Search
CPC .............. A47L 15/4212; A47L 15/00–508
See application file for complete search history.

(56) References Cited

U.S. PATENT DOCUMENTS

2009/0266442 A1* 10/2009 Duscher ............... G01F 23/243
141/95
2013/0319483 A1* 12/2013 Welch ................... A47L 15/421
134/103.1

FOREIGN PATENT DOCUMENTS

CN     100588362 C    2/2010
DE     10246016 A1    4/2004

OTHER PUBLICATIONS

Standex Electronics Liquid Level Sensor, https://standexelectronics.com/products/fps-b-series-hvacr-liquid-level-sensor/ (Year: 2012).*

* cited by examiner

*Primary Examiner* — Spencer E Bell
(74) *Attorney, Agent, or Firm* — Dority & Manning, P.A.

(57) ABSTRACT

A flood detection sensor for a dishwasher appliance is provided. The flood detection sensor includes features that allow for detection of flood events or tub overfills without sacrificing performance or efficiency of the dishwasher during normal operating conditions and for secure mounting to a tub lip of the dishwasher.

15 Claims, 5 Drawing Sheets

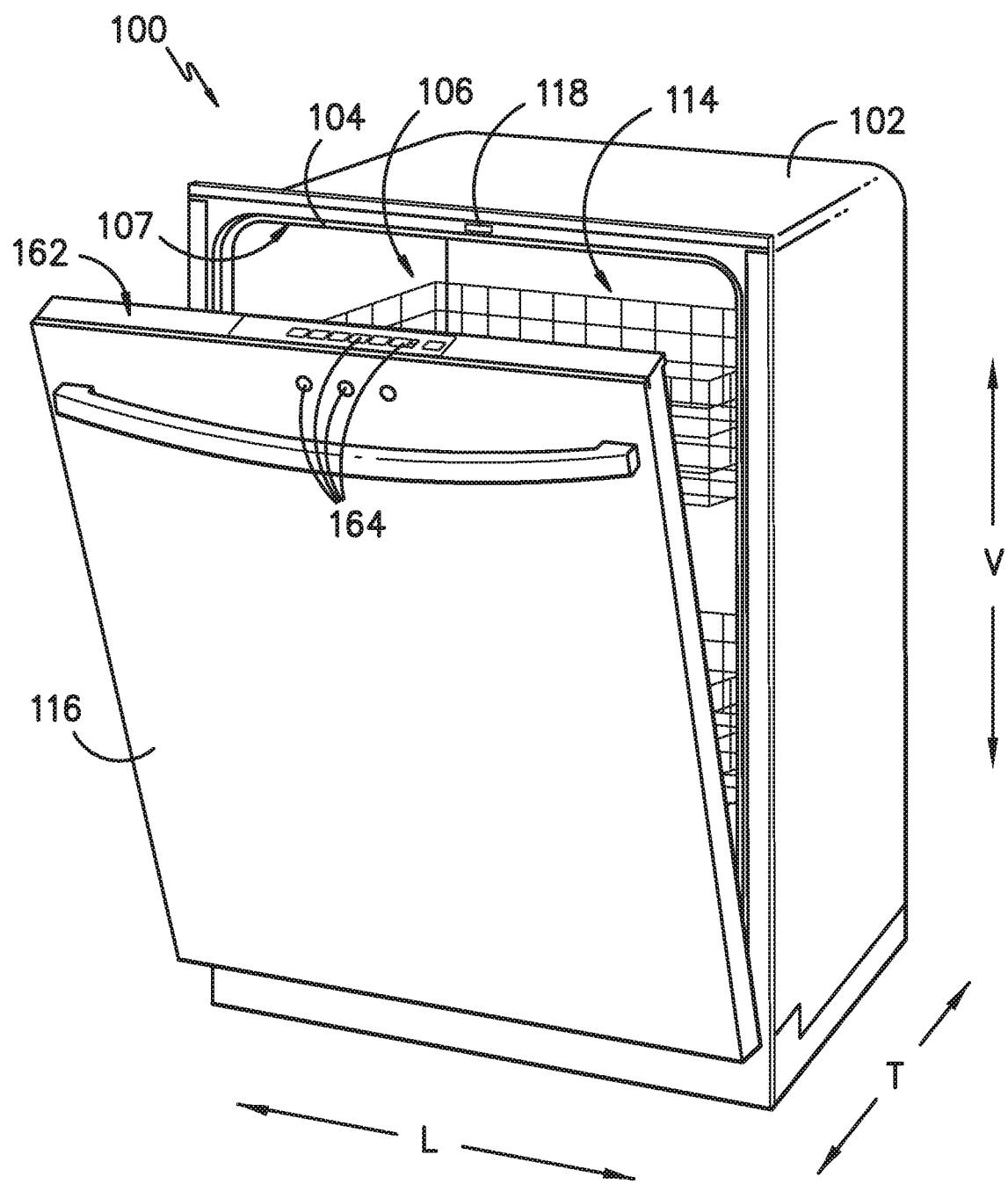
FIG. -1-

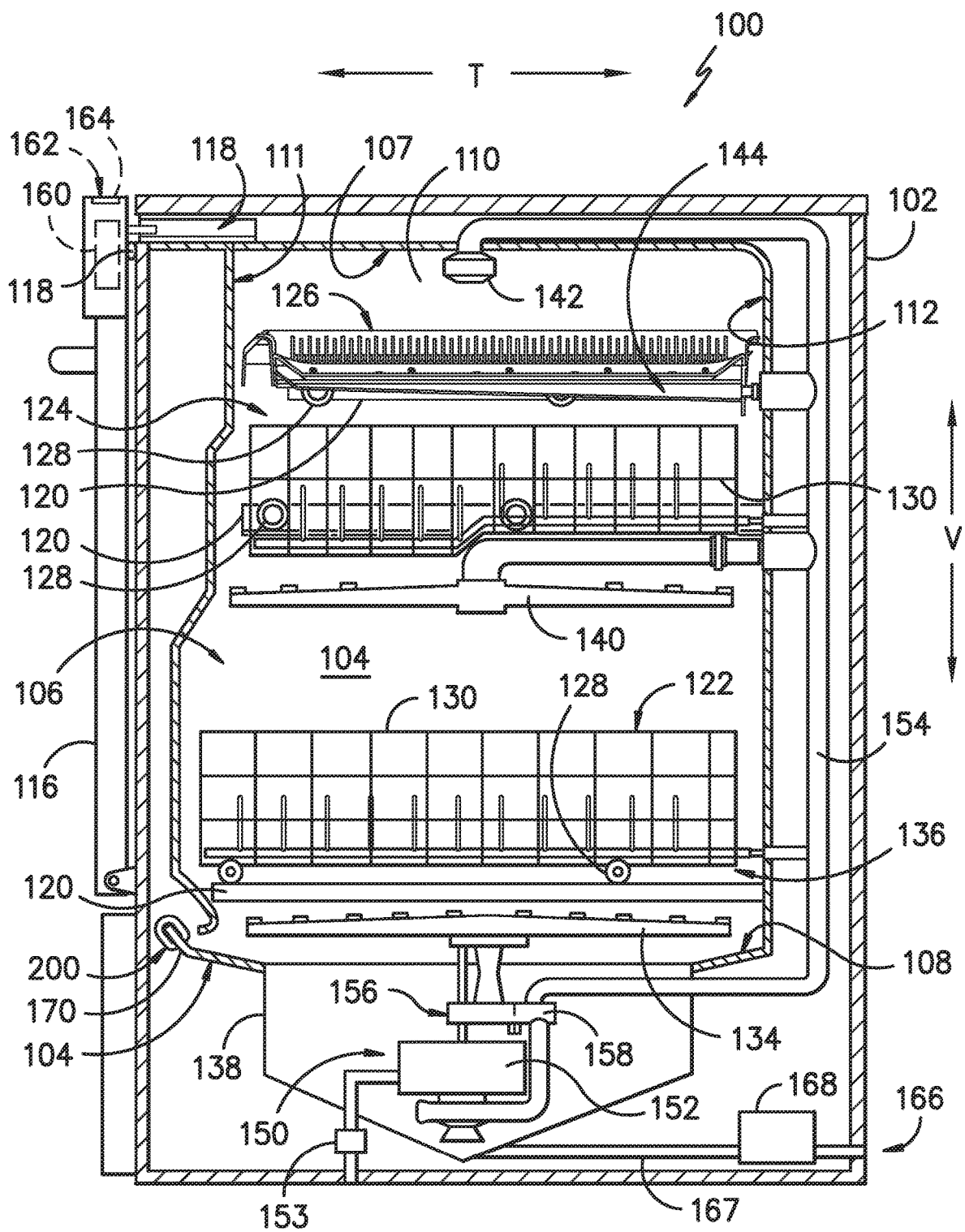
FIG. -2-

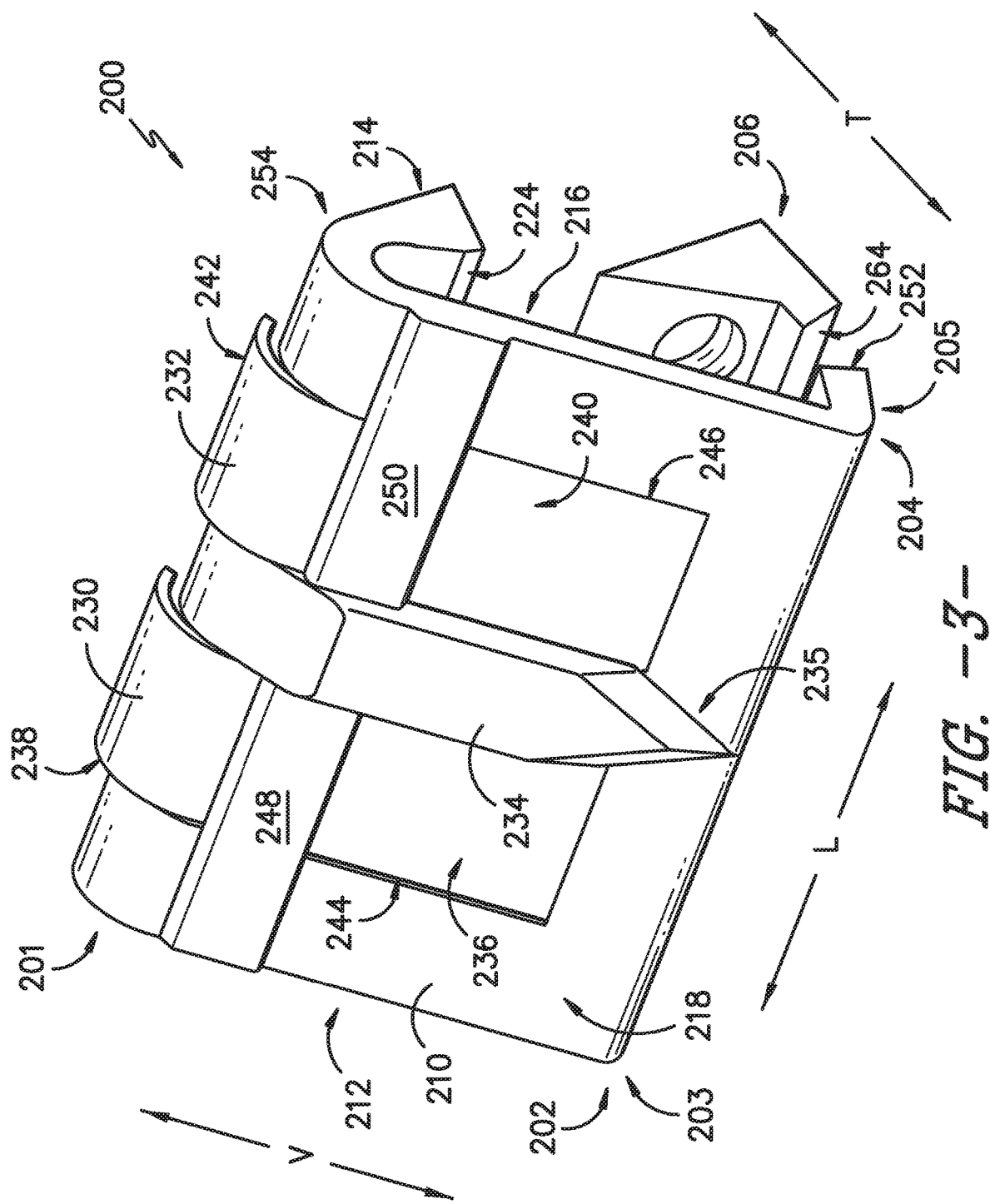
FIG. -3-

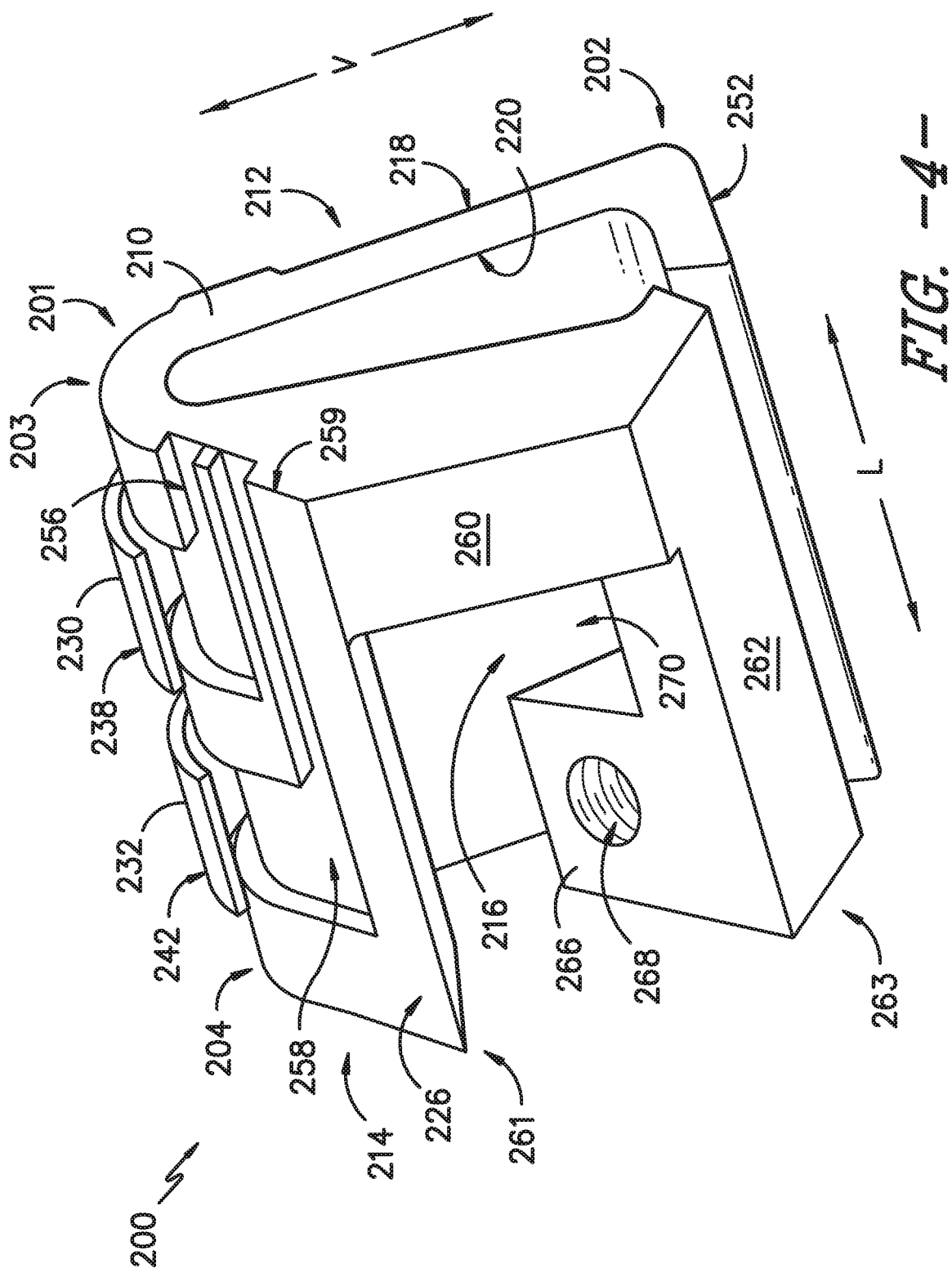

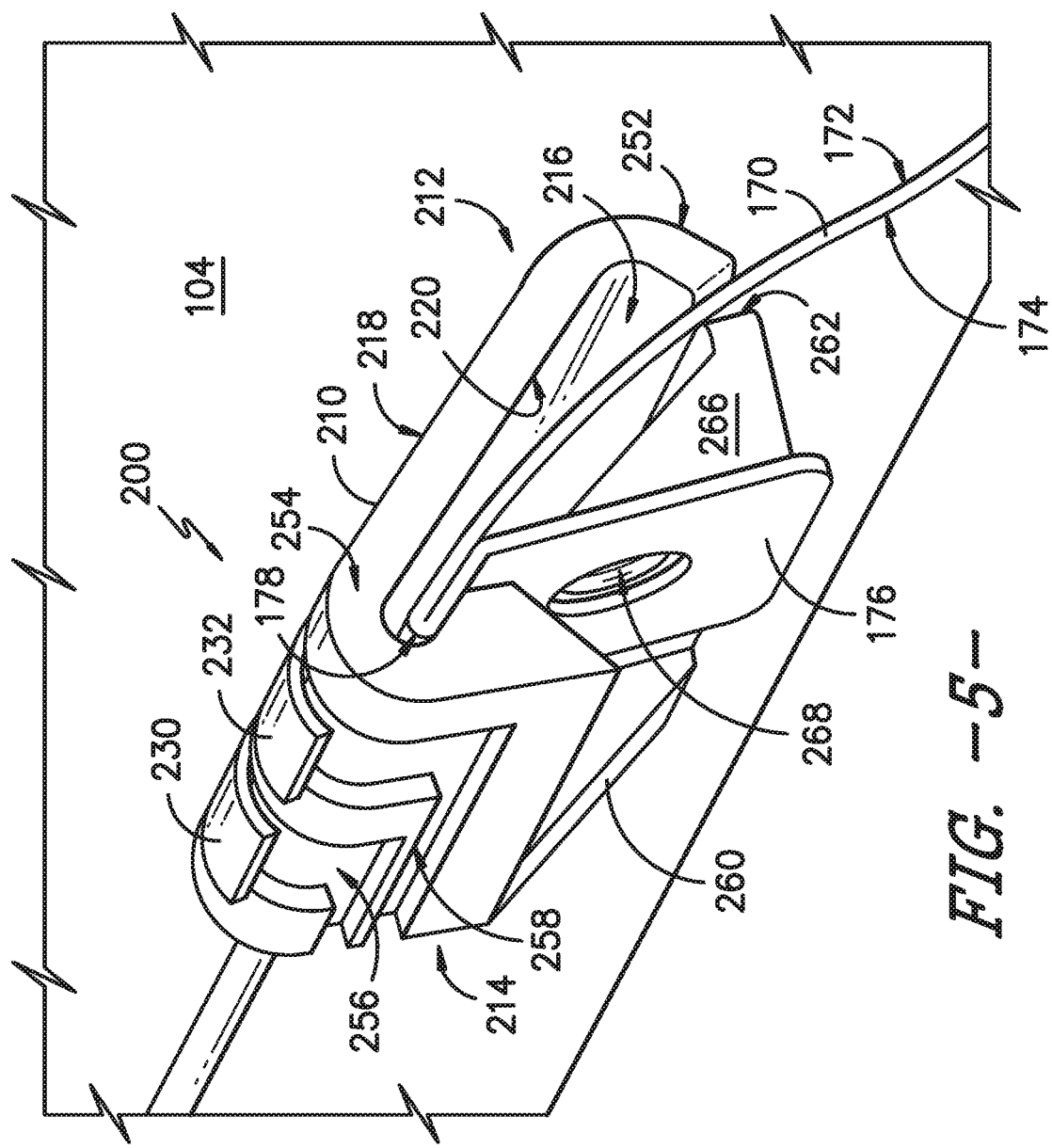
FIG. -5-

FLOOD DETECTION SENSOR FOR A DISHWASHER APPLIANCE

FIELD OF THE INVENTION

The present disclosure relates generally to dishwasher appliances, and more particularly to flood detection devices for dishwasher appliances.

BACKGROUND OF THE INVENTION

Dishwasher appliances generally include a tub that defines a wash chamber. Rack assemblies can be mounted within the wash chamber of the tub for receipt of articles for washing. Multiple spray assemblies can be positioned within the wash chamber for applying or directing wash fluid towards articles disposed within the rack assemblies in order to clean such articles. Dishwasher appliances are also typically equipped with at least one pump for circulating fluid through the multiple spray assemblies. In addition, diverter water valve devices may be used to control the flow of fluid received from the pump.

Under certain conditions, dishwasher appliances are prone to flooding over a tub lip of the tub. For instance, dishwasher appliances may be prone to flooding over the tub lip during an out-of-level condition, a water valve failure, and/or a drain pump failure. When one or more of such conditions occur, the water level can rise above the designed fill level and spill over the tub lip and onto the floor. This may be detrimental to consumers' homes.

Certain dishwasher appliances include features for detecting tub overfills or flood events. For example, some conventional dishwasher appliances include float sensors. To detect a flood event, the float sensor floats on top of the water in the tub, and if the float sensors floats upward to a certain height, the float sensor triggers a response indicating a flood event. One challenge with float sensors is that they are typically located proximate the sump area of the tub, and accordingly, such float sensors affect the water flow through the sump area during wash and drain cycles. This may decrease the efficiency and performance of the dishwasher appliance during normal operating conditions. Moreover, such float sensors can take up a relatively large amount of space and can be expensive to manufacture.

Accordingly, an improved flood detection sensor for a dishwasher appliance that addresses one or more of the challenge noted above would be useful.

BRIEF DESCRIPTION OF THE INVENTION

The present subject matter provides a flood detection sensor for a dishwasher appliance that includes features that allow for detection of flood events or tub overfills without sacrificing performance or efficiency of the dishwasher during normal operating conditions and for secure mounting to a tub lip of the dishwasher. Additional aspects and advantages of the invention will be set forth in part in the following description, may be apparent from the description, or may be learned through practice of the invention.

In accordance with one exemplary embodiment, a dishwasher appliance is provided. The dishwasher appliance includes a cabinet and a tub positioned within the cabinet. The tub defines a wash chamber for receipt of articles for washing. The tub includes a tub lip. The dishwasher appliance also includes one or more spray assemblies. The dishwasher appliance further includes a flood detection sensor positioned on or mounted to the tub lip. The flood detection sensor includes a housing. The flood detection sensor also includes a first electrical lead positioned on or mounted to the housing, the first electrical lead having a first charge. The flood detection sensor further includes a second electrical lead positioned on or mounted to the housing and spaced apart from the first electrical lead, the second electrical lead having a second charge, wherein the first charge is different than the second charge, and wherein when the first and second electrical leads are bridged by water, an electrical current travels between the first and second leads.

In accordance with another exemplary embodiment, a flood detection sensor mountable to a tub lip of a tub positioned within a cabinet of a dishwasher appliance is provided. The flood detection sensor includes a housing that includes an inner member and an opposing outer member. The inner member and the opposing outer member defining a volume therebetween. When the flood detection sensor is mounted to the tub lip, the tub lip is received within the volume. The flood detection sensor also includes a first electrical lead positioned on or mounted to the inner member of the housing. The flood detection sensor further includes a second electrical lead positioned on or mounted to the inner member of the housing and spaced apart from the first electrical lead, wherein the first electrical lead has a first charge and the second electrical lead has a second charge that is different than the first charge, and wherein when the first and second leads are bridged by water, an electrical current travels between the first and second leads.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an exemplary embodiment of a dishwasher appliance of the present disclosure with a door in a partially open position;

FIG. 2 provides a side, cross sectional view of the exemplary dishwasher appliance of FIG. 1;

FIG. 3 provides a perspective view of an inner side of an exemplary flood detection sensor according to an exemplary embodiment of the present disclosure;

FIG. 4 provides a perspective view of an outer side of the flood detection sensor of FIG. 3; and FIG. 5 provides a side perspective view of another exemplary flood detection sensor positioned on or mounted to a tub lip of a tub of a dishwasher appliance according to an exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "wash fluid" refers to a liquid used for washing and/or rinsing the articles and is typically made up of water that may include other additives such as detergent or other treatments. Furthermore, as used herein, terms of approximation, such as "approximately," "substantially," or "about," refer to being within a ten percent margin of error.

FIGS. 1 and 2 depict an exemplary dishwasher or dishwashing appliance 100 that may be configured in accordance with aspects of the present disclosure. For the particular embodiment of FIGS. 1 and 2, dishwasher 100 defines a vertical direction V, a lateral direction L, and a transverse direction T. Each of the vertical direction V, lateral direction L, and transverse direction T are mutually perpendicular to one another and form an orthogonal direction system. Dishwasher 100 includes a cabinet 102 having a tub 104 therein that defines a wash chamber 106. As shown in FIG. 2, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114 (FIG. 1) and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. Dishwasher 100 includes a door closure mechanism or assembly 118 that is used to lock and unlock door 116 for accessing and sealing wash chamber 106.

As further shown in FIG. 2, tub side walls 110 accommodate a plurality of rack assemblies. More specifically, guide rails 120 are mounted to side walls 110 for supporting a lower rack assembly 122, a middle rack assembly 124, and an upper rack assembly 126. Upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. According to other exemplary embodiments, a silverware basket (not shown) may be removably attached to a rack assembly, e.g., lower rack assembly 122, for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 is generally configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging and/or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in tub 104. More specifically, fluid circulation assembly 150 includes a circulation pump 152 for circulating water and wash fluid (e.g., detergent, water, and/or rinse aid) in tub 104. Circulation pump 152 is located within sump 138 or within a machinery compartment located below sump 138 of tub 104. Circulation pump 152 is in fluid communication with an external water supply line (not shown) and sump 138. A water inlet valve 153 can be positioned between the external water supply line and circulation pump 152 to selectively allow water to flow from the external water supply line to circulation pump 152. Additionally or alternatively, water inlet valve 153 can be positioned between the external water supply line and sump 138 to selectively allow water to flow from the external water supply line to sump 138. Water inlet valve 153 can be selectively controlled to open to allow the flow of water into dishwasher 100 and can be selectively controlled to cease the flow of water into dishwasher 100. Further, fluid circulation assembly 150 may include one or more fluid conduits or circulation piping for directing water and/or wash fluid from circulation pump 152 to the various spray assemblies and manifolds. For example, for the embodiment depicted in FIG. 2, a primary supply conduit 154 extends from circulation pump 152, along rear 112 of tub 104 along the vertical direction V to supply wash fluid throughout wash chamber 106.

As further illustrated in FIG. 2, primary supply conduit 154 is used to supply wash fluid to one or more spray assemblies, e.g., to mid-level spray arm assembly 140 and upper spray assembly 142. However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from circulation pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc.

In operation, circulation pump 152 draws wash fluid in from sump 138 and pumps it to a diverter water valve 156, e.g., which is positioned within sump 138 of dishwasher appliance. Diverter water valve 156 may include a diverter disk (not shown) disposed within a diverter chamber 158 for selectively distributing the wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter water valve 156 is configured for selectively distributing the flow of wash fluid from circulation pump 152 to various fluid supply conduits, only some of which are illustrated in FIG. 2 for clarity. More specifically, diverter water valve 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level and/or upper spray assemblies 140, 142, e.g., such as primary supply conduit 154.

Drainage of soiled water within sump 138 may occur, for example, through drain assembly 166. In particular, water may exit sump through a drain and may flow through a drain conduit 167. A drain pump 168 may facilitate drainage of the soiled water by pumping the water to a drain line external to the dishwasher 100.

Dishwasher 100 is further equipped with a controller 160 to regulate operation of dishwasher 100. Controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 160 may be positioned in a variety of locations throughout dishwasher 100. In the illustrated embodiment, controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of the dishwasher 100. In one embodiment, the user interface 164 may represent a general purpose I/O ("GPIO") device or functional block. In one embodiment, the user interface 164 may include input components, such as one or more of a variety of electrical, mechanical or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter.

With reference to FIG. 2, in some instances, tub 104 of dishwasher 100 may experience a tub overfill or flood event, e.g., when water floods over a tub lip 170 of tub 104. Such an overfill or flood condition can occur as a result of any number of conditions, such as e.g., an out-of-level condition, a water valve failure, and/or a drain pump failure. Accordingly, for this embodiment, dishwasher 100 includes a flood detection sensor 200 that is operatively configured to detect high water levels or conditions within tub 104 so that appropriate action can be taken to prevent an overfill or flood event.

For instance, in some embodiments, when the water within tub 104 has reached a predetermined water level threshold, flood detection sensor 200 communicates with controller 160 to indicate that a high water level is present within tub 104. In this way, controller 160 may control dishwasher appliance 100 to prevent the overfill or flood event or reduce its impact. As one example, controller 160 can be in electrical communication with diverter water valve 156 and can control diverter water valve 156 of fluid circulation assembly 150 to close. As another example, controller 160 can be in electrical communication with circulation pump 152 and can control circulation pump 152 of fluid circulation assembly 150 to cease operation. As yet another example, controller 160 can be in electrical communication with drain pump 168 and can turn on or kick on drain pump 168 to drain the water from sump 138. As an additional example, controller 160 can be in electrical communication with water inlet valve 153 and can control water inlet valve 153 to close. In some embodiments, controller 160 can control one or more of the above noted components in response to a high water level condition. For instance, in some embodiments, controller 160 can be in electrical communication with water inlet valve 153 and drain pump 168 and can control water inlet valve 153 to close and drain pump 168 to turn on to drain the water from sump 138. As such, the high water level condition within tub 104 can be addressed more efficiently. Other combinations are also possible. Further, in some embodiments, after a high water level condition is detected within tub 104, one or more of the components noted above can be prevented from operating until there is no longer a high water level condition detected in tub 104.

In some alternative embodiments, upon detection of the water within tub 104 reaching the predetermined water level threshold, flood detection sensor 200 can directly trigger a shutdown of the water flow through dishwasher 100, e.g., by opening a switch electrically coupled with circulation pump 152 or diverter water valve 156 of fluid circulation assembly 150 (or both). Additionally or alternatively, flood detection sensor 200 can be in electrical communication with drain pump 168 and can directly trigger drain pump 168 to pump water out of sump 138. In yet other embodiments, flood detection sensor 200 can be in electrical communication with drain pump 168 and water inlet valve 153 and can directly trigger drain pump 168 to pump water out of sump 138 and water inlet valve 153 to close when a high water level condition is detected by flood detection sensor 200.

Moreover, notably, as shown in FIG. 2, flood detection sensor 200 is positioned on or mounted to tub lip 170 of tub 104, and more particularly, flood detection sensor 200 is positioned on or mounted to tub lip 170 at front side 111 of tub 104 for this embodiment. By positioning flood detection sensor 200 at or on tub lip 170, flood detection sensor 200 does not interfere with the water flow through sump 138 during wash and drain cycles and takes up a minimal amount of space, e.g., compared to float sensors. In addition, by placing flood detection sensor 200 at front side 111 of tub 104, flood detection sensor 200 is advantageously positioned to detect water spillage or floods over the front portion of tub 104, which is a location where water is likely to spill or flood onto the floor of a consumers' home in the event of a water breach over this portion of tub 104.

FIGS. 3 and 4 provide various views of flood detection sensor 200. In particular, FIG. 3 provides a perspective view of an inner side of flood detection sensor 200 according to an exemplary embodiment of the present disclosure. FIG. 4 provides a perspective view of an outer side of flood detection sensor 200.

As shown in FIGS. 3 and 4, flood detection sensor 200 includes a housing 210 that extends between a top end 201 and a bottom end 202 along the vertical direction V, between a first side 203 and a second side 204 along the lateral direction L, and an inner side 205 and an outer side 206 along the transverse direction T. Although flood detection sensor 200 is described and illustrated in FIGS. 3 and 4 with reference to the vertical, lateral, and transverse directions V, L, T, various portions of flood detection sensor 200 may not extend in such directions when mounted to tub lip 170, e.g., as shown in FIG. 2. Housing 210 functions as the main structural component of flood detection sensor 200 and includes an inner member 212 and an opposing outer member 214. Inner member 212 and outer member 214 define a volume 216 therebetween that is sized to accept or receive tub lip 170 of tub 104 (FIG. 2). In this manner, flood detection sensor 200 can be placed over or mounted on tub lip 170 of tub 104.

Inner member 212 extends generally in a plane along the vertical and lateral directions V, L and has a thickness along the transverse direction T (FIG. 3). In particular, the thickness is defined by a distance between an inner surface 218 and an outer surface 220 (FIG. 4) of inner member 212. When flood detection sensor 200 is positioned on or mounted to tub lip 170, inner surface 218 of inner member 212 faces the interior of tub 104 and outer surface 220 faces toward tub lip 170 (FIG. 2).

As shown particularly in FIG. 3, flood detection sensor 200 includes a pair of electrical leads positioned on or mounted to inner member 212. As shown, flood detection sensor 200 includes a first electrical lead 230 and a second electrical lead 232. For this embodiment, first and second electrical leads 230, 232 are each in electrical communication with a power source (not shown), e.g., via connectors and wires. Moreover, for this embodiment, first and second electrical leads 230, 232 are in electrical communication with controller 160 (FIG. 2), which may double as the power source. The first electrical lead 230 has a first charge and the second electrical lead 232 has a second charge. The first charge is different than the second charge. For instance, the first charge of first electrical lead 230 can be a positive charge and the second charge of the second electrical lead 232 can be a negative charge. During normal operation of dishwasher 100, first and second electrical leads 230, 232 have a nominal voltage differential across them.

When first and second electrical leads 230, 232 are bridged by water, e.g., during a flood or overfill event during operation of dishwasher 100, an electrical current travels from one lead to the other, completing a circuit that includes the electrical leads and controller 160, among other possible electrical components. The change or increase in electrical current through the circuit is indicative of a high water level condition. The change in electrical current through the circuit can be measured by any suitable parameter (e.g., a change in current, voltage, or resistance) by any suitable electrical device (e.g., a multimeter positioned within controller 160). When a high water level condition is detected, an appropriate response can be taken. For instance, controller 160 can control a water valve of fluid circulation assembly 150 (FIG. 2) to a closed position or can turn off circulation pump 152 (FIG. 2). In this way, fluid circulation assembly 150 ceases circulating water to the spray assemblies 134, 140, 142 (FIG. 2). In some embodiments, upon detection of a high water level condition, a switch or relay in electrical communication with flood detection sensor 200 can be switched such that water through dishwasher appliance 100 can be directly shutoff without being relayed through controller 160.

As further shown in FIG. 3, first electrical lead 230 and second electrical lead 232 are each oriented generally along the vertical direction V and are spaced from one another along the lateral direction L. For this embodiment, first and second electrical leads 230, 232 are spaced or separated along the lateral direction L by a separation member 234. Separation member 234 extends generally along the vertical direction V between the first and second electrical leads 230, 232 and has a width along the lateral direction L. Separation member 234 includes a pointed edge 235 at or adjacent bottom 202 of housing 210 so as to facilitate the flow of water to first and second electrical leads 230, 232 in the event of a tub overfill or flood event. Moreover, for this embodiment, separation member 234 has a raised geometry that protrudes further outward from housing 210 than first and second electrical leads 230, 232 along the transverse direction T to deter false trips of flood detection sensor 200 (e.g., to prevent water from splashing on both of the leads). Moreover, the raised geometry of separation member 234 prevents or discourages water from pooling between the leads or from collecting more generally on inner member 212.

In alternative embodiments, separation member 234 may be a sunk geometry, or a geometry that is recessed with respect to first and second electrical leads 230, 232. In such embodiments, separation member may define one or more openings that allow for water to exit the recessed separation member 234 and return to sump 138 (FIG. 2). In yet other alternative embodiments, housing 210 defines a gap between first and second electrical leads 230, 232. By including a gap between first and second electrical leads 230, 232, water is restricted from flowing from one lead to the other inadvertently.

With reference still to FIG. 3, first electrical lead 230 includes a planar portion 236 and a curved portion 238. Planar portion 236 of first electrical lead 230 extends generally from bottom end 202 to top end 201 along the vertical direction V and curved portion 238 curves over the top end 201 of housing 210. By curving first electrical lead 230 proximate top end 201, the vertical span of flood detection sensor 200 is minimized. Moreover, planar portion 236 is fit or positioned within a first recess 244 defined by inner member 212 such that first electrical lead 230 sits flush with inner surface 218 of inner member 212. By seating first electrical lead 230 flush with inner surface 218 of inner member 212, water roll off of first electrical lead 230 is facilitated.

In a similar fashion, as shown in FIG. 3, second electrical lead 232 includes a planar portion 240 and a curved portion 242. Planar portion 240 of second electrical lead 232 extends generally from bottom end 202 to top end 201 along the vertical direction V and curved portion 242 curves over the top end 201 of housing 210. By curving second electrical lead 232 proximate top end 201, the vertical span of flood detection sensor 200 is minimized. Moreover, planar portion 240 is fit or positioned within a second recess 246 defined by inner member 212 such that second electrical lead 232 sits flush with inner surface 218 of inner member 212. By seating second electrical lead 232 flush with inner surface 218 of inner member 212, water roll off of second electrical lead 232 is facilitated.

In some alternative embodiments, first and second recesses 244, 246 and first and second electrical leads 230, 232 extend the entire vertical length of inner member 212. In this way, first and second electrical leads 230, 232 may extend further into the interior of tub 104, and thus, in the event of a tub overfill or flood event, first and second electrical leads 230, 232 will be bridged by the rising water within tub 104 sooner. Accordingly, dishwasher 100 may have more time to take action in response to the tub overfill or flood event.

As further shown in FIG. 3, first and second electrical leads 230, 232 are held in place by securing members. In particular, a first securing member 248 holds first electrical lead 230 in place and a second securing member 250 holds second electrical lead 232 in place. As shown, first securing member 248 extends generally along the lateral direction L from first side 203 of housing 210 to separation member 234. Second securing member 250 extends generally along the lateral direction L from second side 204 of housing 210 to separation member 234. For this embodiment, first and second securing members 248, 250 are molded integrally with inner member 212. In alternative embodiments, first and second securing members 248, 250 can be formed separately from housing 210.

As shown in FIG. 4, inner member 212 includes a standoff member 252 positioned at or adjacent bottom end 202 of housing 210. Standoff member 252 extends from outer surface 220 of inner member 212 toward outer member 214 along the transverse direction T as shown in FIG. 4. Standoff member 252 is operatively configured to space inner member 212 from tub lip 170 when flood detection sensor 200 is mounted to tub lip 170 (FIG. 2). When flood detection sensor 200 is mounted to tub lip 170, standoff member 252 engages an inner surface 172 of tub lip 170 (FIG. 5).

A hook portion 254 of housing 210 connects inner member 212 with outer member 214 (FIG. 3). More particularly, hook portion 254 connects inner member 212 with outer member 214 at or adjacent top 201 of housing 210. As such, inner member 212 and outer member 214 are formed of a single unitary piece. Hook portion 254 functions as a hook and fits over tub lip 170 (FIG. 2). In alternative exemplary embodiments, inner member 212 and outer member 214 need not be formed of a single unitary piece. For instance, in some exemplary embodiments, inner member 212 and outer member 214 can be two separate pieced operatively coupled by a hinge.

Outer member 214 extends generally in a plane along the vertical and lateral directions V, L and has a thickness along the transverse direction T. In particular, the thickness is defined by a distance between an inner surface 224 (FIG. 3) and an outer surface 226 (FIG. 4) of outer member 214. When flood detection sensor 200 is positioned on or mounted to tub lip 170, inner surface 224 of outer member 214 faces toward tub lip 170 and outer surface 226 faces toward the exterior of dishwasher 100 (FIG. 5).

As shown in FIG. 4, proximate top end 201, outer member 214 defines a first channel 256 and a second channel 258. First channel 256 is generally an L-shaped channel and extends along the lateral direction L from first side 203 of housing 210 to where the first electrical lead 230 is positioned along the lateral direction L. Thereafter, first channel 256 extends along the vertical direction V toward curved portion 238 of first electrical lead 230. In a similar fashion, second channel 258 is generally an L-shaped channel and extends along the lateral direction L from first side 203 of housing 210 to where second electrical lead 232 is positioned along the lateral direction L. Thereafter, second channel 258 extends along the vertical direction V toward curved portion 242 of second electrical lead 232. Thus, first channel 256 extends proximate first electrical lead 230 to an edge 259 of housing 210 and second channel 258 extends proximate second electrical lead 232 to edge 259 of housing 210. First and second channels 256, 258 provide a space or void in which one or more wires may extend, e.g., from a connector connected to one of the first or second electrical leads 230, 232 to an electrical power source.

With reference still to FIG. 4, for this embodiment, first channel 256 is contiguous with first recess 244 (FIG. 3) and second channel 258 is contiguous with second recess 246 (FIG. 3). By continuing the first and second recesses 244, 246 into their respective first and second channels 256, 258, first and second electrical leads 230, 232 are spaced from housing 210 proximate their curved portions 238, 242. This allows for connectors to more easily connect with first and second electrical leads 230, 232.

As further shown in FIG. 4, outer member 214 includes a vertical member 260 that extends generally along the vertical direction V between a top portion 261 of outer member 214 and a snap fit member 262 positioned at or adjacent a bottom portion 263 of outer member 214. Snap fit member 262 extends generally along the lateral direction L and functions to secure flood detection sensor 200 with tub lip 170 (FIG. 2), e.g., by snapping against tub lip 170. More particularly, snap fit member 262 includes a mating surface 264 (FIG. 3) that mates with outer surface 174 of tub lip 170 (FIG. 5). In this way, snap fit member 262 opposes standoff member 252 of inner member 212 to secure flood detection sensor 200 with tub lip 170. As further shown in FIG. 4, outer member 214 defines a cutout 270 separating top portion 261 from bottom portion 263 of outer member 214. Cutout 270 provides more surfaces in which a user may grip flood detection sensor 200 when positioning or mounting flood detection sensor 200 on or to tub lip 170.

Protruding from snap fit member 262 is a securing flange 266 that defines a threaded opening 268 that allows for threaded engagement with a mechanical fastener. As shown particularly in FIG. 5, the threaded opening 268 can be aligned with an opening defined by a tab 176 of tub lip 170 and a mechanical fastener (not shown) can be inserted therein to further secure flood detection sensor 200 with tub lip 170. The mechanical fastener can be, for example, a screw, a bolt, or other suitable threaded fasteners.

FIG. 5 provides a side, perspective view of another embodiment of flood detection sensor 200 positioned on or mounted to tub lip 170 of tub 104. The exemplary flood detection sensor 200 of FIG. 5 is configured in a similar manner as the flood detection sensor of FIGS. 3 and 4, and accordingly, the same or similar numbering refers to the same or similar part. Flood detection sensor 200 of FIG. 5 is a mirror image of the flood detection sensor of FIGS. 3 and 4. Flood detection sensor 200 can be positioned on or mounted to tub lip 170 in the following exemplary manner.

Flood detection sensor 200 is first placed over tub lip 170. In particular, volume 216 extending between inner member 212 and outer member 214 receives tub lip 170 and hook portion 254 hooks over top edge 178 of tub lip 170 as shown in FIG. 5. Standoff member 252 of inner member 212 engages inner surface 172 of tub lip 170. Snap fit member 262 of outer member 214 is pulled outward away from tub lip 170, and when flood detection sensor 200 is positioned on tub lip 170 to the desired height along tub lip 170, snap fit member 262 snaps outer member 214 into place by engaging outer surface 174 of tub lip 170. As shown in FIG. 5, snap fit member 262 and standoff member 252 apply opposing forces on tub lip 170 to secure flood detection sensor 200 to the desired height.

For this embodiment, the desired height is a height in which flood detection sensor 200 is positioned on tub lip 170 such that first and second electrical leads 230, 232 extend a distance into the interior of tub 104. In particular, for this embodiment, first and second electrical leads 230, 232 extend about 0.50 inches (1.27 cm) into tub 104. In this way, in the event of a tub overfill or flood event, the rising water level can bridge the first and second electrical leads 230, 232 such that an electrical current can travel therebetween. Upon sensing the high water level condition within tub 104, (e.g., by detecting the change in current in the circuit), appropriate action can be taken, such as controlling fluid circulation assembly 150 to cease the flow of water through dishwasher 100. In other embodiments, first and second electrical leads 230, 232 extend about 1 inch (2.54 cm) into tub 104. In yet other embodiments, first and second electrical leads 230, 232 extend about 1.25 inches (3.175 cm) into tub 104.

In some embodiments, flood detection sensor 200 is positioned on or mounted to tub lip 170 such that the position of first and second electrical leads 230, 232 relative to top edge 178 of tub lip 170 will detect flood or overfill events at out of level conditions exceeding or exceeding about 0.25 inches (0.635 cm) while still remaining at a height close enough to tub lip 170 to minimize false tripping during normal operating conditions.

After positioning or mounting flood detection sensor 200 on or to tub lip 170 and adjusting flood detection sensor 200 to the desired height, flood detection sensor 200 is then slid horizontally (e.g., along the lateral direction L or transverse direction T) such that flood detection sensor 200 is positioned proximate tab 176 of tub lip 170. In particular, flood detection sensor 200 is positioned such that threaded opening 268 of securing flange 266 is aligned with the opening defined by tab 176. In this manner, as noted above, a mechanical fastener (not shown) can be inserted therein to further secure flood detection sensor 200 with tub lip 170. By securing flood detection sensor 200 with securing flange 266, horizontal movement of flood detection sensor 200 is prevented, and additionally, such secure connection can further assist a user with determining the desired height of flood detection sensor 200.

In alternative exemplary embodiments, flood detection sensor 200 need not be secured by securing flange 266 or may be further secured to tub lip 170 in other suitable manners. As one example, instead of securing flange 266 defining threaded opening 268, securing flange 266 can include a clip that clips on to tab 176. As another example, securing flange 266 can include a nub or stop that locates flood detection sensor 200 along tub lip 170 when flood detection sensor 200 is slid horizontally.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dishwasher appliance, comprising:
   a cabinet;
   a tub positioned within the cabinet and defining a wash chamber for receipt of articles for washing, the tub comprising a tub lip;
   one or more spray assemblies;
   a flood detection sensor positioned on or mounted to the tub lip, the flood detection sensor comprising:
      a housing;

a first electrical lead positioned on or mounted to the housing, the first electrical lead having a first charge; and a second electrical lead positioned on or mounted to the housing and spaced apart from the first electrical lead, the second electrical lead having a second charge, wherein the first charge is different than the second charge;

wherein the first electrical lead and the second electrical lead are spaced apart by a separation member, and wherein the separation member has a raised geometry that protrudes further outward from the housing than the first electrical lead and the second electrical lead;

wherein when the first and second electrical leads are bridged by water, an electrical current travels between the first and second leads.

2. The dishwasher appliance of claim 1, further comprising:

a fluid circulation assembly comprising a diverter water valve and a circulation pump for circulating water to the one or more spray assemblies; and a controller in electrical communication with the diverter water valve and the circulation pump and with the first electrical lead and the second electrical lead of the flood detection sensor;

wherein when the electrical current travels between the first and second electrical leads, a high water level condition is detected within the tub and the controller controls at least one of the diverter water valve and the circulation pump such that water ceases circulating to the one or more spray assemblies.

3. The dishwasher appliance of claim 1, further comprising:

a fluid circulation assembly configured for circulating water to the one or more spray assemblies;

wherein the first and second electrical leads are in electrical communication with the fluid circulation assembly, and wherein when the electrical current travels between the first and second electrical leads, a high water level condition is detected within the tub and the fluid circulation assembly ceases circulating water to the one or more spray assemblies.

4. The dishwasher appliance of claim 1, further comprising:

a drain assembly comprising a drain pump; and a controller in electrical communication with the drain pump and with the first electrical lead and the second electrical lead of the flood detection sensor;

wherein when the electrical current travels between the first and second electrical leads, a high water level condition is detected within the tub and the controller controls the drain pump to drain water from the tub.

5. The dishwasher appliance of claim 1, further comprising:

a water inlet valve for selectively allowing a flow of water into the dishwasher; and a controller in electrical communication with the water inlet valve and with the first electrical lead and the second electrical lead of the flood detection sensor;

wherein when the electrical current travels between the first and second electrical leads, a high water level condition is detected within the tub and the controller controls the water inlet valve to close.

6. The dishwasher appliance of claim 1, wherein the flood detection sensor is positioned on or mounted to the tub lip at a front side of the dishwasher appliance.

7. The dishwasher appliance of claim 1, wherein the housing comprises an inner member and an opposing outer member defining a volume therebetween, and wherein when the flood detection sensor is positioned on or mounted to the tub lip, the tub lip is received within the volume.

8. The dishwasher appliance of claim 7, wherein the tub lip has an inner surface and an opposing outer surface, and wherein the inner member comprises a standoff member and the outer member comprises a snap fit member, and wherein when the flood detection sensor is positioned on or mounted to the tub lip, the standoff member engages the inner surface of the tub lip and the snap fit member snaps the flood detection sensor into place and engages the outer surface of the tub lip.

9. The dishwasher appliance of claim 1, wherein the housing comprises an inner member and an opposing outer member defining a volume therebetween, and wherein the inner member defines a first recess and a second recess and comprises an inner surface, and wherein the first and second electrical leads are recessed within the first and second recesses, respectively, such that the first electrical lead and the second electrical lead are positioned flush with the inner surface of the inner member.

10. The dishwasher appliance of claim 1, wherein the housing extends between a top and a bottom, and wherein the first and second electrical leads extend from at or adjacent the bottom of the housing to the top of the housing, and wherein each of the first and second electrical leads comprise a planar portion and a curved portion, and wherein the curved portions of the first and second electrical leads are positioned at or adjacent the top of the housing.

11. The dishwasher appliance of claim 1, wherein the tub lip comprises a top edge, and wherein the housing comprises an inner member and an opposing outer member defining a volume therebetween, and wherein a hook portion connects the inner member with the outer member and fits over the top edge of the tub lip.

12. The dishwasher appliance of claim 1, wherein the housing comprises an inner member and an opposing outer member defining a volume therebetween, and wherein the outer member defines a first channel and a second channel, the first channel extending proximate the first electrical lead to an edge of the housing and the second channel extending proximate the second electrical lead to the edge of the housing.

13. The dishwasher appliance of claim 1, wherein the housing comprises an inner member and an opposing outer member defining a volume therebetween, and wherein the tub lip comprises a tab defining an opening, and wherein the outer member comprises a securing flange defining a threaded opening aligned with the opening of the tab, wherein the threaded opening is configured to receive a mechanical fastener therein.

14. A dishwasher appliance, comprising:

a cabinet;

a tub positioned within the cabinet and defining a tub lip and a wash chamber for receipt of articles for washing;

one or more spray assemblies; and a flood detection sensor positioned on or mounted to the tub lip, the flood detection sensor comprising a housing supported by the tub;

a first electrical lead positioned on or mounted to the housing;

a second electrical lead positioned on or mounted to the housing, spaced apart from the first electrical lead, wherein the second lead has a voltage differential with the first electrical lead whereby a current is conducted between the leads when such are bridged by water; and a separation member positioned on the housing between the leads and protruding from the housing.

15. A dishwasher appliance, comprising:

a cabinet;

a tub positioned within the cabinet and defining a wash chamber for receipt of articles for washing, the tub comprising a tub lip;

one or more spray assemblies;

a flood detection sensor positioned on or mounted to the tub lip, the flood detection sensor comprising:

a housing;

a first electrical lead positioned on or mounted to the housing, the first electrical lead having a first charge;

a second electrical lead positioned on or mounted to the housing and spaced apart from the first electrical lead, the second electrical lead having a second charge, wherein the first charge is different than the second charge;

wherein when the first and second electrical leads are bridged by water, an electrical current travels between the first and second leads; and wherein the housing comprises an inner member and an opposing outer member defining a volume therebetween, and wherein the inner member defines a first recess and a second recess and comprises an inner surface, and wherein the first and second electrical leads are recessed within the first and second recesses, respectively, such that the first electrical lead and the second electrical lead are positioned flush with the inner surface of the inner member.

* * * * *